UNITED STATES PATENT OFFICE.

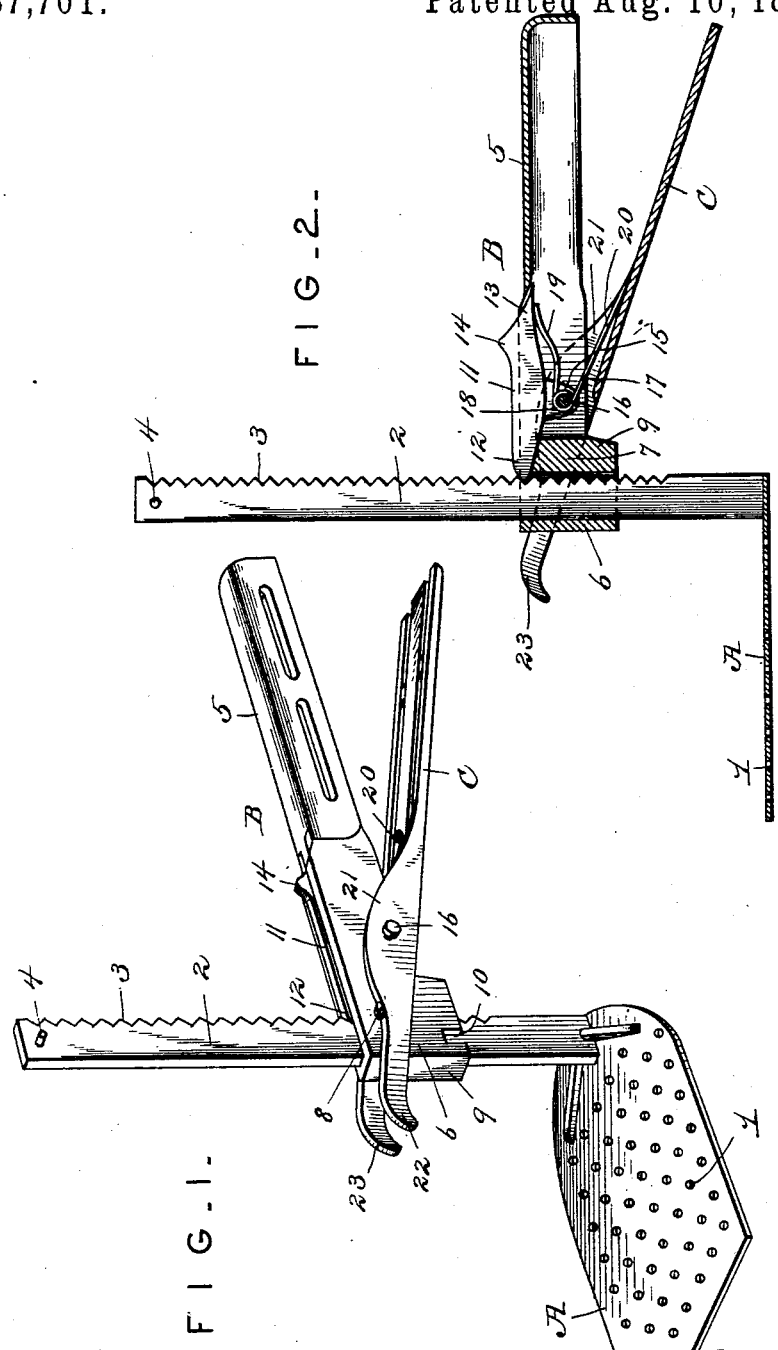

FRANK CARLSON, OF DULUTH, MINNESOTA, ASSIGNOR OF ONE-HALF TO JOSEPH C. MISHLER, OF SAME PLACE.

PAN OR PLATE LIFTER.

SPECIFICATION forming part of Letters Patent No. 587,701, dated August 10, 1897.

Application filed June 30, 1896. Serial No. 597,626. (No model.)

*To all whom it may concern:*

Be it known that I, FRANK CARLSON, a citizen of the United States, residing at Duluth, in the county of St. Louis and State of Minnesota, have invented certain new and useful Improvements in Pan and Plate Lifters; and I do hereby declare the following to be a full, clear, and exact description of the invention, such as will enable others skilled in the art to which it appertains to make and use the same.

My invention relates to pan and plate lifters.

My object is to provide a more simple, cheap, and handy pan and plate lifter which will be adapted for quick and easy manipulation and will more satisfactorily hold the article than has heretofore been possible.

Having this object in view, my invention consists of certain improved features and novel combinations appearing more fully hereinafter.

In the accompanying drawings, Figure 1 is a perspective view of my improved lifter; Fig. 2, a sectional view.

A designates a rest which consists of a flat plate provided with perforations 1 and preferably of the same outline as the heel of an ordinary shoe. From the central point of the curved end of this plate arises an integral rack-bar 2, having closely-spaced teeth 3 and a stop 4 at its upper end.

I employ a hand-lever B, comprising a hollow slotted handle 5 and an open runner 6, formed integral. The runner is open vertically, with the exception of a partition 7, which extends therethrough from top to bottom. On the opposite sides of this runner are located respective stops or lugs 8, and the runner is provided with a lower depending portion 9, which has notches 10, that are adapted to receive the braces of the rest.

The numeral 11 designates a dog having a front finger 12, adapted to engage with the rack-bar, a rear finger 13, projecting into the handle, a thumb-button or finger-hold 14, and a depending portion 15.

The numeral 16 designates a pivot-pin which passes through the runner and depending portion of the dog. A spring 17 is coiled around the pin at 18 and provided with two arms 19 and 20, the former of which abuts on the rear finger of the dog and keeps the front finger depressed onto the partition and in engagement with the rack-bar. The other arm of the spring abuts on a gripping-lever now to be described.

C designates my improved gripping-lever. This lever is provided with flanges 21, between which the runner of the hand-lever is received. These flanges are extended into downwardly-curved fingers 22 and 23, which are adapted to pass over the edge of the pan or plate being lifted. The pivot-pin passes loosely through the flanges just described.

The spring heretofore described keeps the handle of the gripping-lever normally down and the fingers thereof raised and abutting on the lugs or stops of the runner.

The lifter is used in the following manner: The rest is first placed under the pan or plate. The hand-lever is then moved down the proper distance and the gripping-lever grasped to bring its curved fingers down over the edge of the pan or plate. When thus grasped, the pan or plate may be lifted from place to place easily and quickly. Upon releasing the grasp on the gripping-lever the pan or plate is released and the lifter can be removed.

Slight and immaterial changes might be resorted to by a skilled mechanic, and it is to be understood, therefore, that I do not limit myself to the precise construction herein shown and described, but consider that I am entitled to all such variations as come within the spirit and scope of the invention.

Having thus described my invention, what I claim as new is—

1. In a pan or plate lifter, the combination with a rest and a rack-bar connected thereto, of a hand-lever slidable on the rack-bar, a dog normally in engagement with the rack-bar, and a gripping-lever pivoted to the hand-lever, substantially as described.

2. In a pan or plate lifter, the combination with a rest and a rack-bar connected thereto, of a hand-lever slidable on the rack-bar, a dog normally in engagement with the rack-bar, and a spring-pressed gripping-lever pivoted to the hand-lever and provided with curved fingers, substantially as described.

3. In a pan or plate lifter, the combination with a rest, and a rack-bar connected thereto, of a hand-lever slidable on the rack-bar, a pivoted spring-pressed dog normally in engagement with the rack-bar, and a pivoted spring-pressed gripping-lever provided with curved fingers, substantially as described.

In testimony whereof I have signed this specification in the presence of two subscribing witnesses.

FRANK CARLSON.

Witnesses:
R. S. POWELL,
W. T. MISHLER.